Figure 6:
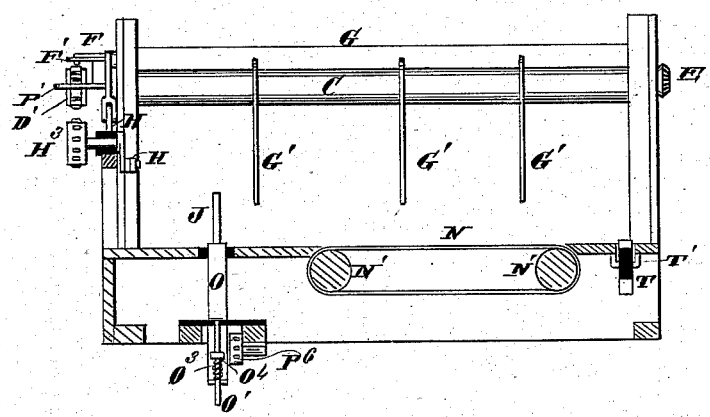

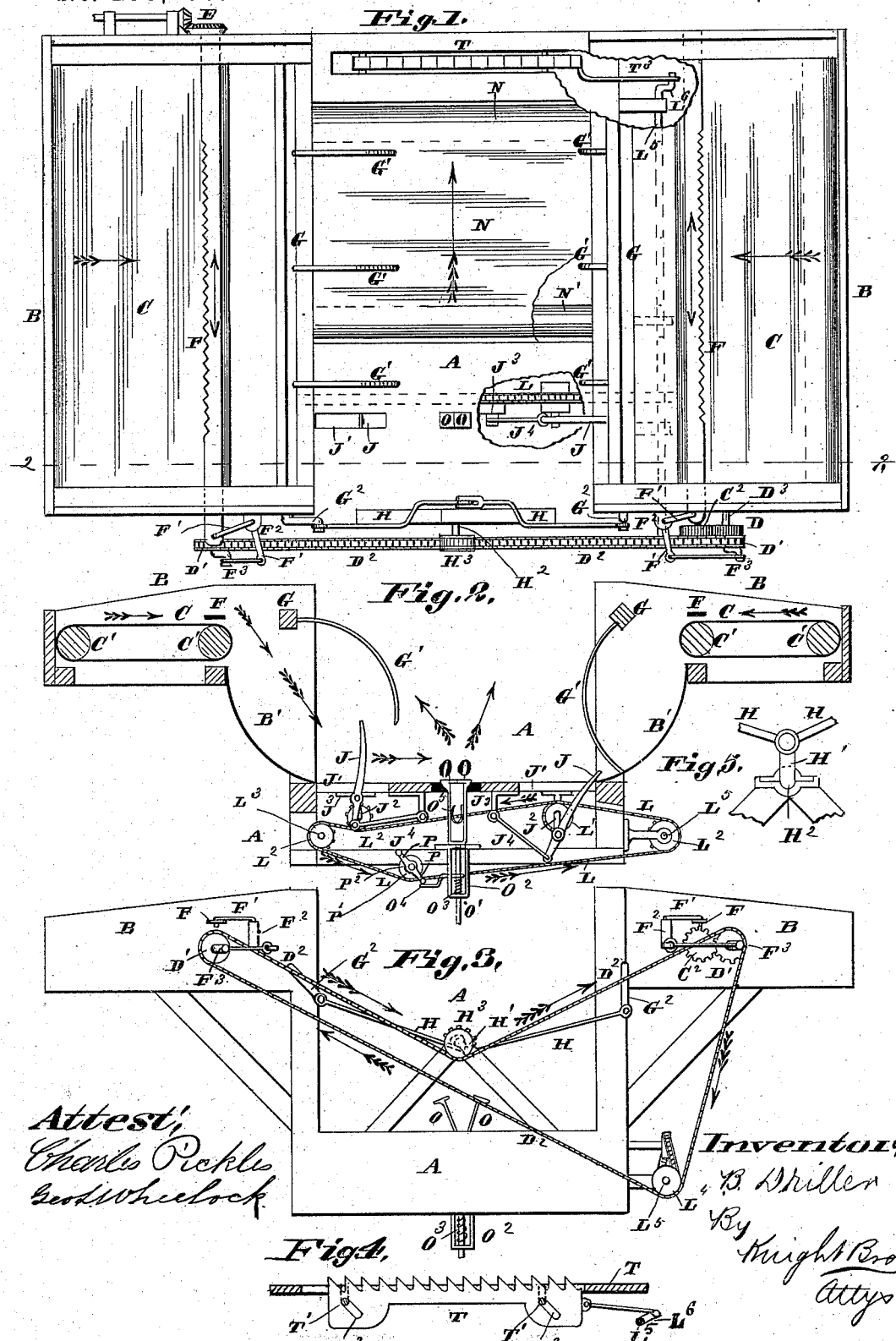

(No Model.)  2 Sheets—Sheet 2.
B. DRILLER.
BAND CUTTER AND FEEDER FOR THRASHING MACHINES.

No. 293,155. Patented Feb. 5, 1884.

Attest:
Charles Pickle
Geo. H. Wheelock

Inventor:
Bernard Driller
By Knight Bros
Attys

UNITED STATES PATENT OFFICE.

BANNAD DRILLER, OF ST. CHARLES, MISSOURI.

BAND-CUTTER AND FEEDER FOR THRASHING-MACHINES.

SPECIFICATION forming part of Letters Patent No. 293,155, dated February 5, 1884.

Application filed September 22, 1883. (No model.)

*To all whom it may concern:*

Be it known that I, BANNAD DRILLER, of St. Charles, in the county of St. Charles and State of Missouri, have invented a certain new and useful Improvement in Band-Cutters and Feeders for Thrashing-Machines, of which the following is a full, clear, and exact description, reference being had to the accompanying drawings, forming part of this specification, and in which—

Figure 1 is a top view, part being broken away. Fig. 2 is a vertical section taken on line 2 2, Fig. 1. Fig. 3 is a front end view, and Figs. 4 and 5 are enlarged detail views. Fig. 6 is a vertical longitudinal section through the middle of the machine.

My invention relates to an apparatus for cutting bands and feeding the machine; and my invention consists in features of novelty hereinafter fully described, and pointed out in the claims.

Referring to the drawings, A represents the body of the apparatus, made in the form of a cradle or trough, and which is located at the front end of the machine, and may be removably attached thereto. Its bottom is on line, or nearly so, with the mouth of the machine, so that the grain will easily be discharged from it into the machine. It is provided with side wings, B B, which may be rigidly secured to it or removably secured; or, if desired, may be hinged thereto, so as to be folded during transportation. Curved sheets of metal, or other suitable material, B' B', are placed between the wings and body, to convey the grain from the former to the latter. Sheaves are alternately thrown on the two wings, which are provided with endless aprons to receive the sheaves. The aprons are lettered C C, and are supported on rollers C' C', journaled in suitable bearings, to one or both of each pair of which power is applied to move the aprons in the direction shown by the arrows in Figs. 1 and 2. The rollers are preferably turned by one of them being connected to the machine by suitable gear-wheels and shafting, E, (see Fig. 1,) and this one connected by means of chain-wheels D' (see Figs. 1 and 3) and chain-belt $D^2$ to an idler gear-wheel, D, on a shaft, $D^3$, properly supported in bearings, which meshes into a similar wheel, $C^2$, on the end of one of the rollers of the other pair. As the sheaves are moved by the aprons toward the body or cradle of the apparatus they come against reciprocating cutters F, which cut the bands. The cutters are located just above the inner parts of the aprons, being supported by passing through the ends of the wings, as shown, or by other suitable means, and are preferably moved back and forth by bell-crank levers $F'$, journaled in brackets $F^2$, secured to the wings. These levers are connected to and operated by cranks $F^3$ on the shafts of the wheels D' of the driving-rollers of the belts or aprons. As the bands are cut the grain or straw falls downward upon the curved plates B', where it is held by arms or fingers G', of which there is one set for each side of the apparatus or each wing, secured to rock bars or shafts G, journaled in the ends of the wings or other suitable supports. These fingers are alternately raised into the position shown in Figs. 1 and 2, left side of said figures, to allow the straw to escape into the cradle or onto the bottom of the body on its way to the machine. The fingers are preferably raised by the rock bars cr shafts having cranks $G^2$, (see Figs. 1 and 3,) which are connected by rods or pitmen H to a crank, H', (see Fig. 5,) on a shaft, $H^2$, journaled in suitable boxes properly supported and located about midway between the two wings. This driving-shaft $H^2$ is preferably turned by having a chain-wheel, $H^3$, engaged by the belt $D^2$. (See Figs. 1 and 3.) As the shaft $H^2$ is turned, it will be seen that, through means of the described connection, the fingers will be alternately raised and lowered, for the purpose stated.

To insure a positive movement of the straw into the cradle, I pivot push-arms J to the bottom of the cradle, which work up through slots J', and have a compound vertical and horizontal movement imparted to their upper ends by their being supported on cranks $J^2$ on short shafts properly supported in journal-boxes, and their lower ends being connected to stationary brackets $J^3$, secured to the bottom of the cradle by rods $J^4$. (See Figs. 1 and 2.) The cranks are turned to impart the described movement to the arms by a chain belt, L, passing over or beneath chain-wheels L' on the shafts of the cranks, and supported by chain-wheels $L^2$ on shafts $L^3$ and $L^5$, one of which (see Fig. 2) is supported in bearings secured to the frame or body of the apparatus. The shaft L⁵ of the first of these wheels carries another chain-wheel, L⁴, engaged by the belt D², and thus power to operate the arms is obtained. These push-arms, as illustrated in Fig. 2, get behind the straw, and, being arranged to operate at the proper time, force it into the cradle as the fingers are raised. They, too, of course also act alternately. As the straw comes into the cradle, it falls partly on and is caught by a traveling apron, N, supported on rollers N', suitably supported, and by it carried into the mouth of the machine. One of the rollers is turned by any suitable mechanical means, to cause the apron to move in the direction shown by the arrow, Fig. 1.

To loosen the straw up when it comes into the cradle, I arrange a "jumper" beneath the cradle, which works up through a slot in the bottom of the cradle. It consists of two pieces, O, hinged to a stem, O', working through a suitable supporting-bracket, O², secured to the cradle. It is forced up by a spring, O³, and pulled down by having a lateral projection, O⁴, which is struck by revolving arms P on a shaft, P', provided with a chain-wheel, P², engaged by the belt, L. (See Fig. 2.) The straw, as it comes into the cradle, extends over the floor and endless apron. As the jumper rises to spread the straw, its two members are forced apart into the position shown in Fig. 3 by a spring, O⁵, placed between and secured to one of them. (See Fig. 2.) As the straw leaves the cradle, entering the machine, it is further spread and loosened by a serrated bar, T, working through a slot in the bottom of the cradle. (See Figs. 1, 4, and 6.) The bar is supported by hangers T', transverse of the slot beneath the floor, having cross-bars received in diagonal slots T² in the bar, and it is operated by a crank, L⁶, on the shaft L⁵, to which it is connected by an arm or pitman, T³. The bar thus has a compound vertical and horizontal movement imparted to it.

It will thus be understood that my apparatus will take charge of the sheaves when first placed upon it and deliver the straw in a proper condition to the machine.

I claim as my invention—

1. In a band-cutter and feeder, the combination of a cradle, wings secured thereto, an apron and knife in each wing, plates and fingers to receive the straw and deliver it to the floor of the cradle, an apron to catch and deliver the straw from the floor of the cradle, and mechanism to operate the different moving parts.

2. The combination of a cradle, wings, plates, a pair of rock-bars provided with fingers, and suitable means whereby the bars are operated alternately, for the purpose specified.

3. The combination of a cradle, wings thereto, aprons, cutters, and suitable means for operating the aprons and the cutters, for the purpose set forth.

4. The arms and suitable means for operating them, in combination with the cradle, wings, plates, and fingers, for the purpose set forth.

5. The jumper having two arms and a cradle having a floor through which the jumper moves, in combination with suitable means for operating the jumper.

6. The jumper made in two parts, a spring for opening the parts as the jumper is raised, and suitable means for operating the jumper, in combination with a cradle.

7. The combination, with a cradle having a floor formed with a slot transverse thereof, of the hangers transverse of and beneath the floor-slot, the serrated bar to project through the floor-slot, having diagonal slots for the cross-bars of the hangers, and means to reciprocate the bar.

BANNAD DRILLER.

In presence of—
  GEO. H. KNIGHT,
  SAML. KNIGHT.